(12) United States Patent
Deiss et al.

(10) Patent No.: US 9,540,805 B2
(45) Date of Patent: Jan. 10, 2017

(54) BUILDING SECTION WITH WINDOW FRAME

(71) Applicant: ISO-Chemie GmbH, Aalen (DE)

(72) Inventors: Martin Deiss, Abtsgmuend (DE); Andreas Lange, Urbach (DE)

(73) Assignee: ISO-Chemie GmbH (DE)

( * ) Notice: Subject to any disclaimer, the term of this patent is extended or adjusted under 35 U.S.C. 154(b) by 0 days.

(21) Appl. No.: 15/156,769

(22) Filed: May 17, 2016

(65) Prior Publication Data

US 2016/0340895 A1 Nov. 24, 2016

(30) Foreign Application Priority Data

May 18, 2015 (EP) .................................... 15168003
Mar. 11, 2016 (EP) .................................... 16159960

(51) Int. Cl.
*E06B 3/96* (2006.01)
*E04B 1/76* (2006.01)
*E06B 1/12* (2006.01)
*E06B 1/26* (2006.01)
*E06B 1/06* (2006.01)
*E06B 1/36* (2006.01)
*E06B 1/62* (2006.01)

(52) U.S. Cl.
CPC ........... *E04B 1/7641* (2013.01); *E04B 1/7604* (2013.01); *E06B 1/06* (2013.01); *E06B 1/12* (2013.01); *E06B 1/26* (2013.01); *E06B 1/36* (2013.01); *E06B 1/62* (2013.01); *E06B 3/9616* (2013.01); *E06B 3/9636* (2013.01)

(58) Field of Classification Search
CPC ........ E04B 1/7641; E04B 1/7604; E06B 1/36; E06B 1/12; E06B 3/9616; E06B 1/06; E06B 1/26; E06B 3/3936; E06B 1/62
See application file for complete search history.

(56) References Cited

U.S. PATENT DOCUMENTS

| 1,960,920 A | * | 5/1934 | Plym ........................ E06B 1/36 16/254 |
| 2,540,419 A | * | 2/1951 | Blanchard ................. E06B 1/06 49/437 |

(Continued)

FOREIGN PATENT DOCUMENTS

| DE | 29707409 U1 | * | 11/1997 | ........... E04B 1/7641 |
| DE | 29913706 U1 | * | 10/1999 | ........... E04B 1/7641 |

(Continued)

*Primary Examiner* — Jeanette E Chapman
(74) *Attorney, Agent, or Firm* — Jansson Munger McKinley & Kirby Ltd.

(57) ABSTRACT

The building section comprises a wall and a peripheral window case, into which a window frame is inserted. The window case comprises several support sections arranged a certain distance apart and standing laterally out from the wall, each support section comprising a support part and an insulating part. The first leg of the support part is screwed to the wall, whereas the window frame is screwed to the second leg of the support part. The insulating part surrounds three sides of the second leg of the support part. In the areas between the support sections, the window case comprises insulating sections. The insulating parts of the support sections and the insulating sections bring about a substantially continuous insulation of the window frame around the window case.

15 Claims, 5 Drawing Sheets

(56) References Cited

U.S. PATENT DOCUMENTS

| | | | | | |
|---|---|---|---|---|---|
| 2,551,518 | A | * | 5/1951 | Weber | F27D 1/004 52/506.03 |
| 4,516,374 | A | * | 5/1985 | Finney | F27D 1/0013 110/336 |
| 4,574,537 | A | * | 3/1986 | Krieger | E04B 1/6183 52/127.9 |
| 5,095,679 | A | * | 3/1992 | Gasser | E06B 3/273 49/DIG. 1 |
| 5,553,420 | A | * | 9/1996 | Klimek | E05C 9/02 49/394 |
| 5,905,679 | A | * | 5/1999 | Tsukikawa | H01L 27/0928 257/355 |
| 2005/0160677 | A1 | * | 7/2005 | Gepfrey | E06B 3/9641 49/504 |
| 2014/0373482 | A1 | * | 12/2014 | Thorndyke | E06B 1/62 52/656.2 |
| 2015/0211285 | A1 | * | 7/2015 | Deiss | E06B 1/36 52/210 |

FOREIGN PATENT DOCUMENTS

| | | | | |
|---|---|---|---|---|
| DE | EP 1295998 A2 | * | 3/2003 | E04B 1/7641 |
| DE | 10157646 A1 | * | 6/2003 | E06B 1/342 |
| DE | EP 2017425 A2 | * | 1/2009 | E06B 1/045 |
| DE | 202012008857 U1 | | 1/2013 | |
| DE | 202012010243 U1 | | 3/2013 | |
| NL | 9401794 A | * | 6/1996 | E06B 3/9616 |
| SE | FR 2259220 A1 | * | 8/1975 | E06B 3/9616 |
| WO | 2015043719 | | 4/2015 | |

\* cited by examiner

BUILDING SECTION WITH WINDOW FRAME

CROSS REFERENCE TO RELATED APPLICATION

This application claims priority based on European patent applications EP 15 168 003.0 filed May 18, 2015, and EP 16 159 960.0 filed Mar. 11, 2016. The entire disclosure and contents of these applications are incorporated by reference into the present application.

BACKGROUND OF THE INVENTION

The invention relates to a building section with a window frame, in which the window frame is inserted into a window case placed laterally in front of the plane of the wall.

For a number of years, wall openings for windows have been artificially extended toward the outside and into the thermal insulation plane or air layer plane.

According to EP 2 639 394 A2, a support part of rigid, load-bearing foam is screwed laterally to the wall and serves to support the window frame to be inserted, especially at the bottom. In this composite thermal insulation system, an outer wall and the inner wall form an intermediate space, in which the support part is arranged. The load-bearing support part with a more-or-less triangular cross section is supplemented by an insulating part, which may consist of rigid flexible foam and cooperates with the support part to form a two-part body with a preferably rectangular cross section. After the support part has been screwed to the inner wall, a separate step is required to connect the insulating part to the support part.

SUMMARY OF THE INVENTION

It is an object of the present invention to provide a building section in which the outwardly offset window frame is optimally supported and insulated and which can be completed in an especially easy and low-cost manner.

According to an aspect of the invention, the building section comprises a wall and a peripheral window case, into which the window frame is inserted, wherein the peripheral window case is offset toward the outside from a plane of the wall. The window case comprises several support sections, which are arranged a certain distance apart and project laterally from the wall, wherein each support section comprises a support part and an insulating part. The support part comprises a first leg with a first side surface facing the wall and a second leg, which projects from the first leg on the side opposite the first side surface. The support part is made of load-bearing material. The insulating part consists of compacted mineral wool or a rigid foam and surrounds three sides of the second leg of the support part. The first leg of the support part is screwed to the wall by at least one fastening element. In addition, the window case comprises insulating sections in the areas between the support sections. The insulating sections consist of compacted mineral wool or rigid foam. The window frame is screwed to the second legs of the support parts of the support sections, under interposition of at least a section of the insulating parts by screw elements. The insulating parts of the support sections and the insulating sections are arranged and configured in such a way that they bring about a substantially continuous insulation of the window frame all the way around the window case.

With this configuration, it is possible to provide the window frame with secure support and high-quality insulation in a plane located in front of the wall plane. In addition, a window case of the type in question can be transported easily in the form of its component parts to the construction site and installed in the wall with little effort.

The insulating sections are preferably configured with two parts, namely, with a filler element as the base and an insulating part, which is set on top of the base. Several filler elements can also be arranged next to each other. Several insulating parts of an insulating section can also be arranged next to each other.

It is especially advantageous for the insulating parts of the insulating sections and the insulating parts of the support sections to have the same cross section. In this case, both can be produced in the same manufacturing step.

As a continuation of the idea described above, it is especially advantageous for the insulating part of at least one insulating section and the insulating part of at least one support section to be configured as a single, one-piece unit. This simplifies the assembly of the window case even more.

In a preferred embodiment, the filler elements correspond substantially to the basic shape of the support parts of the support sections. This ensures that the same, identically formed insulating parts can be set onto both the support parts and the filler elements.

In general, it is preferable for the filler elements to fill up the voids in the insulating parts of the insulating sections substantially completely. This has the result of optimizing the insulating effect. It is also possible for the filler element not to fill the void completely. This results in the presence of one or more closed air chambers, which also contribute to the insulating effect.

The insulating sections are preferably bonded to the wall by an adhesive. As a result, an air-tight connection is created between the insulating section and the wall, and the installation of the insulating sections is thus facilitated.

In a preferred embodiment, the insulating sections can also be bonded to the support sections with an adhesive. This guarantees a secure bond between the insulating sections and the support sections independently of any other fastening measures which may be employed.

The support parts of the support sections, furthermore, comprise a support block, which is arranged between the first leg and the wall. In this way, the legs of the support part provided for the attachment of the window frame can be offset even more from the plane of the wall.

The support block is preferably made of load-bearing rigid foam. The stability of the support part is thus ensured, and the weight of the support part is minimized at the same time.

The first and second legs of each support part are preferably made of metal, especially preferably of steel or aluminum. In this way, the load exerted by the weight of the window frame can be reliably absorbed.

The insulating part of each support section comprises at least one slot, into which the second leg of the support part is inserted. In this way, the insulating part can be set very easily onto the support part and thus held in position at the same time. This is especially true when the second leg of each support part projects at a right angle from the first leg of the support part.

In preferred embodiments, each support part also comprises a third leg, which is parallel to the second leg and projects from the first leg a certain distance away from the second leg, wherein the insulating part of the support section surrounds three sides of both the second leg and the third leg of the support part, and wherein the screw elements for fastening the window frame are also screwed through the third legs of the support parts. This configuration increases the reliability with which the window frame can be screwed to the wall and guarantees additionally that the screw elements cannot twist or tilt.

DETAILED DESCRIPTION

Figure 1:
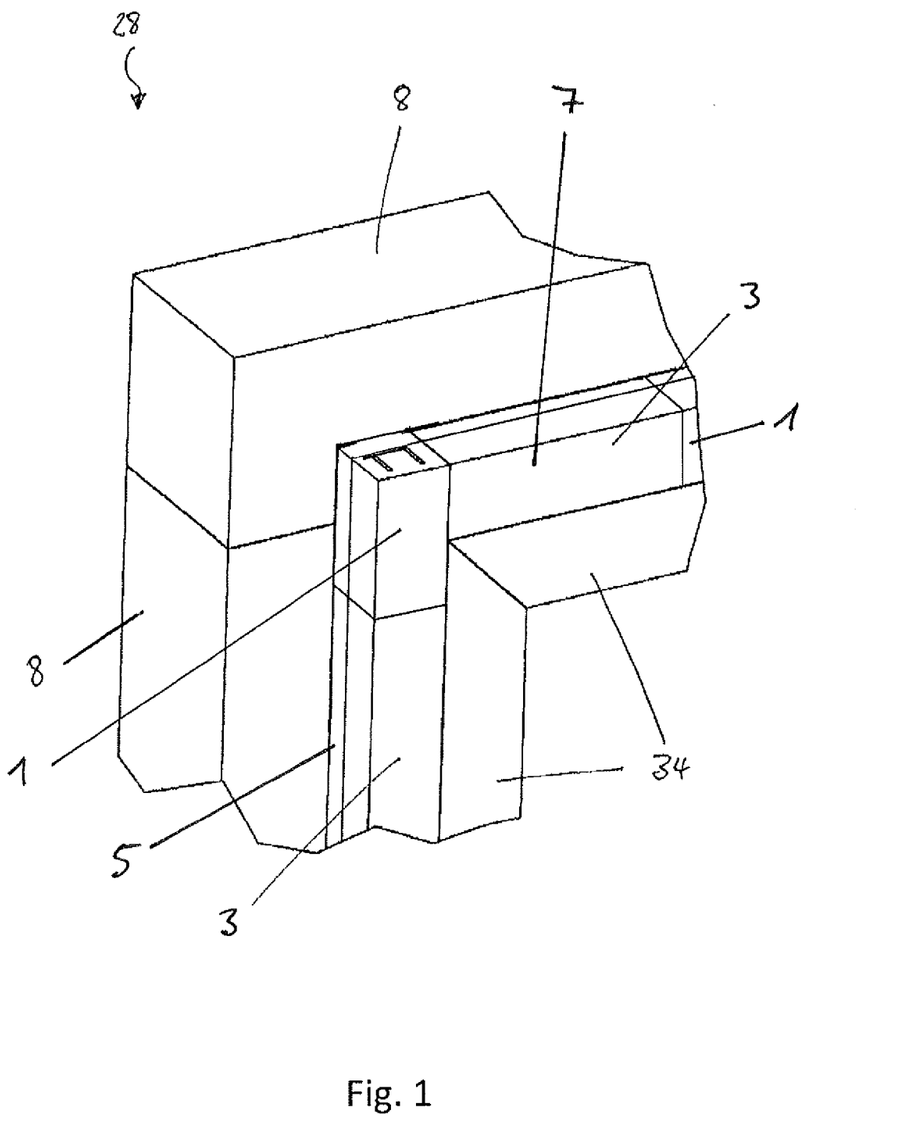
FIG. 1 is a perspective schematic diagram of part of an embodiment of a building section according to the invention with a window case and a window frame inserted into the window case.

FIG. 1 shows an embodiment of a building section 28 according to the invention in schematic fashion. Building section 28 shown here can comprise not only the wall 8, to which the window case 7 is fastened, but also an outer wall (not shown), which is usually formed by thermal insulation material. This outer wall is attached directly to wall 8 without an intermediate space, or there can be an air space between them, and window case 7 will then be arranged in the intermediate space between wall 8 and the outer wall.

Window case 7 in any case is positioned in front of the plane of wall 8 (in the direction toward the exterior of the building), and window frame 34 is supported on window case 7. Window case 7 comprises several support sections 1, arranged a certain distance apart, and insulating sections 3 in the areas between support sections 1.

As can be seen in FIG. 1, support sections 1 can be arranged in all areas of window case 7 (parts of only two of the four sides of the window opening are shown). In each case, at least one and preferably at least two supports sections 1 must be attached underneath the window opening, because that is where most of the weight of the window will rest. Support section 1 preferably has a length of 2-50 cm, and even more preferably of 3-20 cm.

Figure 2:
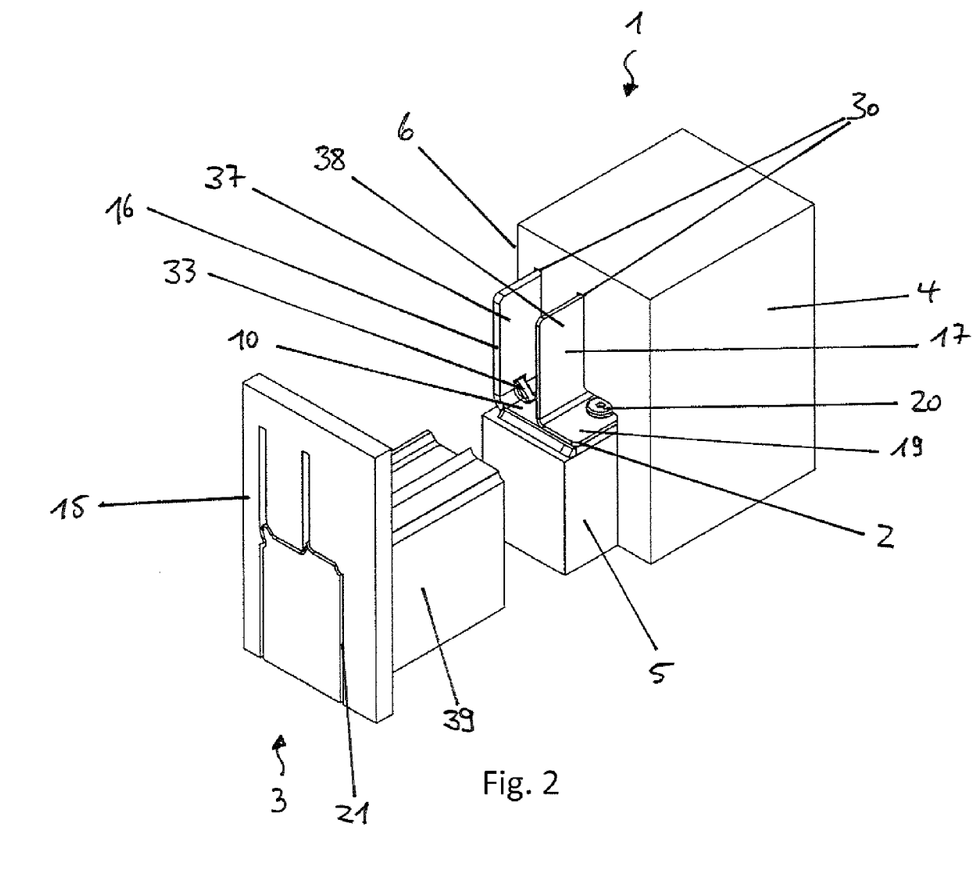
FIG. 2 is a perspective view of parts of a window case, which can be used in a building section according to the invention.
Figure 3:
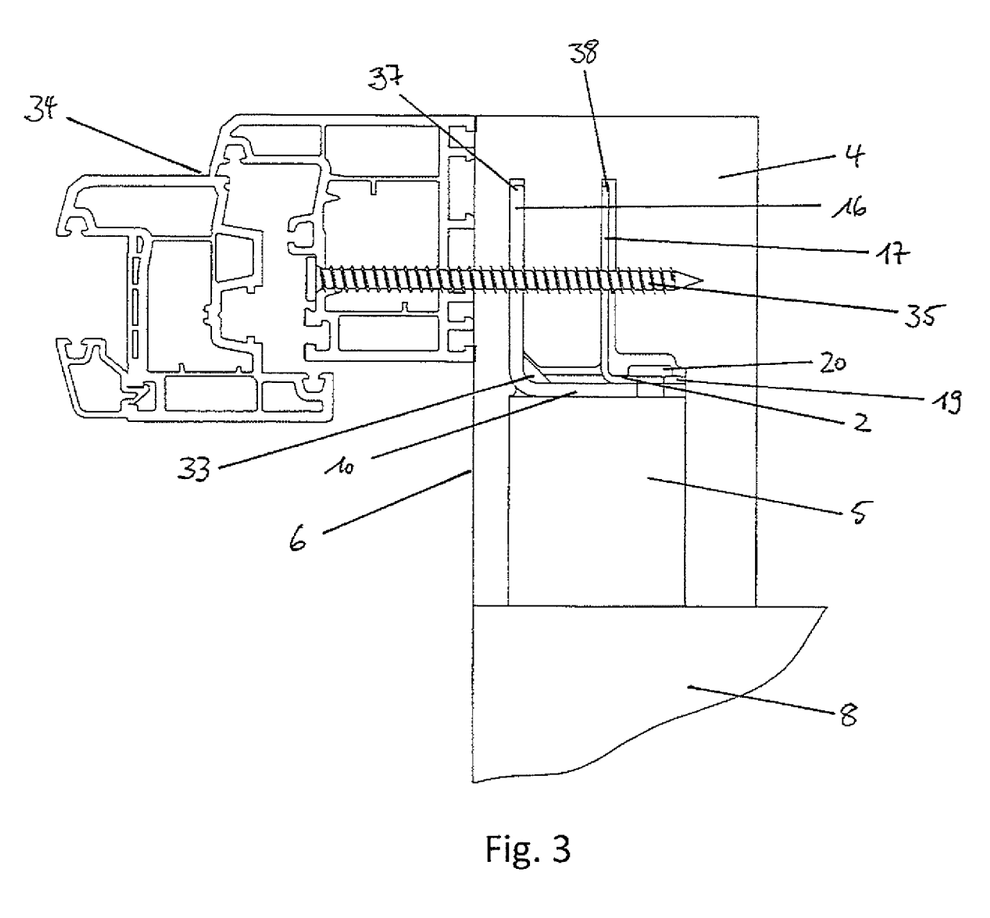
FIG. 3 is a cross-sectional view of a support section of the window case of FIG. 2 with the window frame screwed to it.
Figure 4:
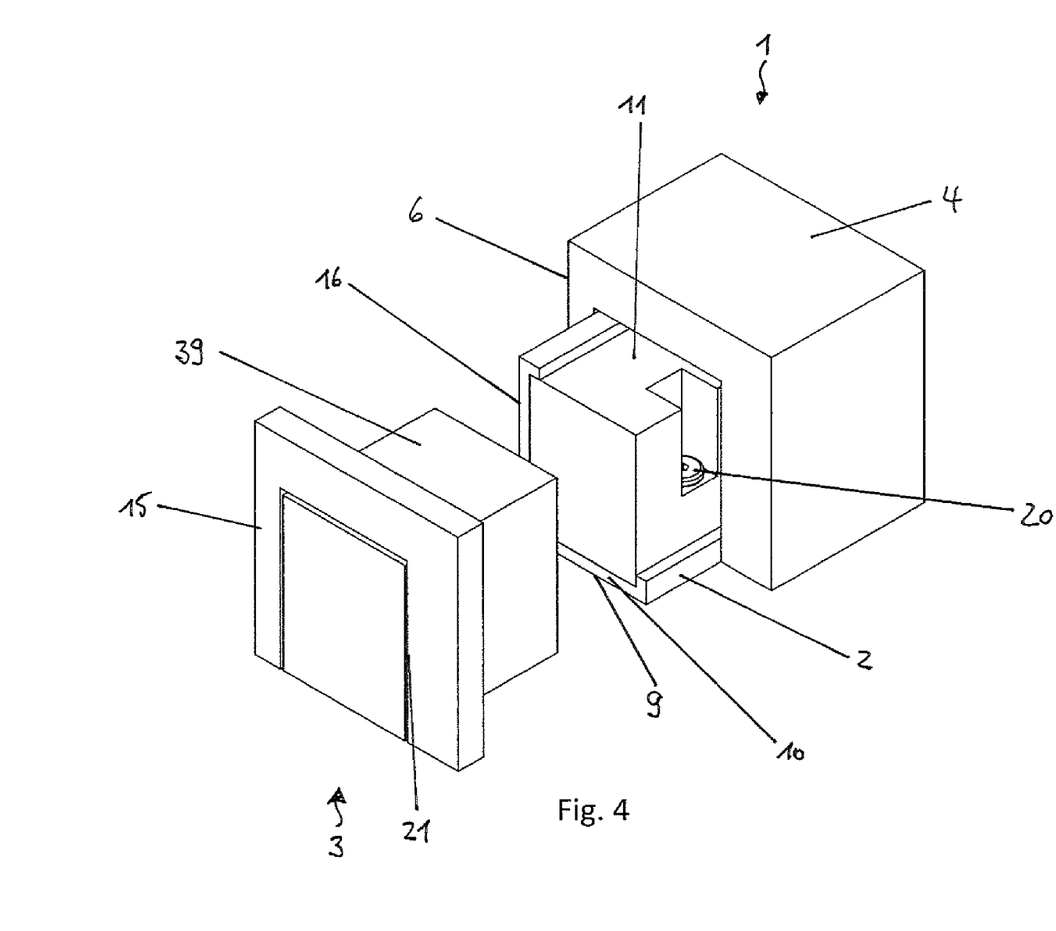
FIG. 4 is a perspective view of parts of another window case which can be used in a building section according to the invention.
Figure 5:
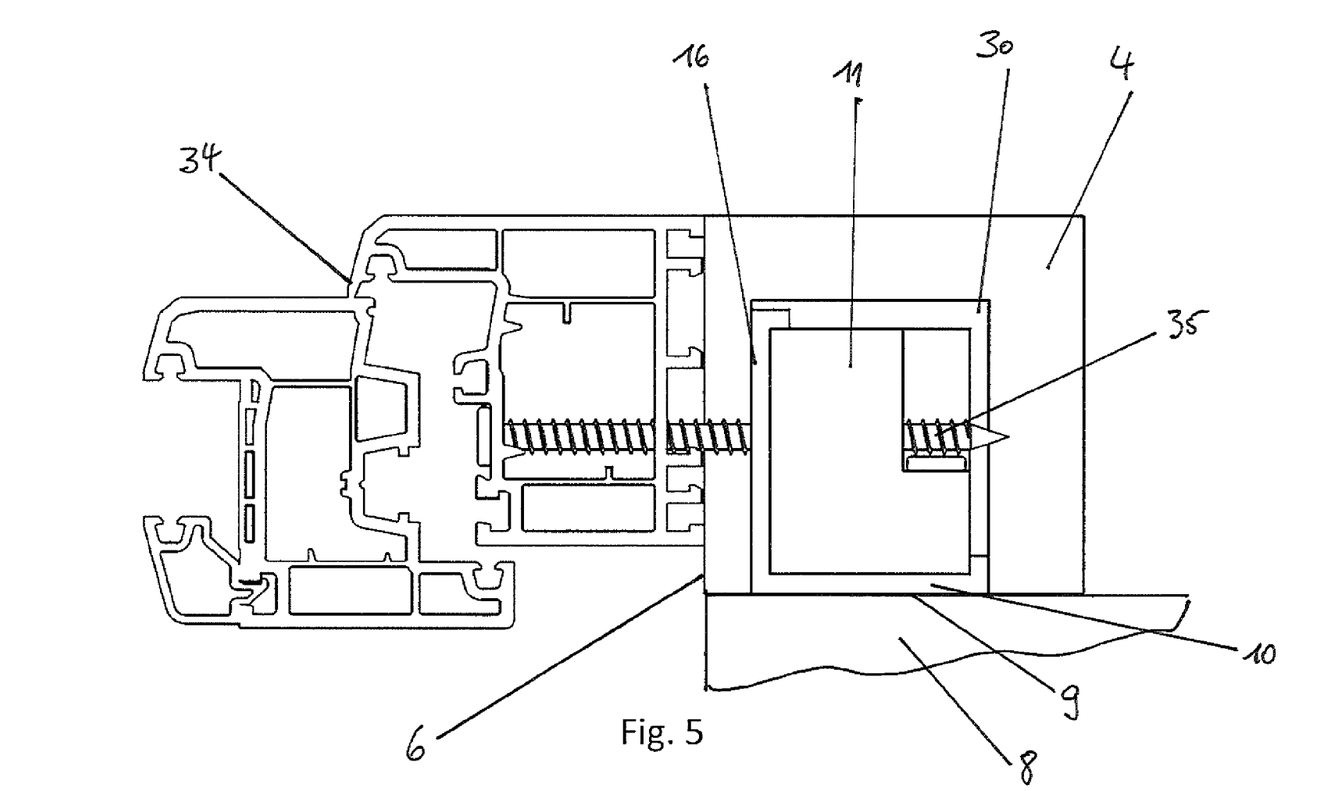
FIG. 5 is a cross-sectional view of a support element of the window case of FIG. 4 with the window frame screwed to it.

Window frame 34 is supported on support sections 1; more precisely, it is supported on a side surface 6 of each support section 1, which is usually a side surface of an insulating part 4 of support section 1 (see FIGS. 2-5). As can be seen in FIGS. 3 and 5, window frame 34 is always screwed to each support section 1 by at least one screw element 35.

Support parts 2 of support sections 1 are screwed to wall 8 by fastening elements 20 (FIGS. 2-5), which are screws in the concrete case. Insulating sections 3 are usually bonded to wall 8 by an adhesive.

Individual support sections 1 and insulating sections 3 are always cut to size in such a way that they butt up against each other. They are then preferably bonded to each other by an adhesive at the surfaces where they meet.

Details of specific embodiments of window cases 7 used within the scope of the invention will now be described more thoroughly with reference to FIGS. 2-5.

It should be pointed out in advance that the orientation of support sections 1 in FIGS. 2-5 is illustrated on the basis of an example of an arrangement located on the right side of window frame 34. Side surface 6, on which window frame 34 is supported, illustrates the orientation of support section 1 in all of the figures.

FIGS. 2 and 3 show parts of a first embodiment of window case 7. Support section 1 comprises a support part 2, to which an insulating part 4 is connected. Support part 2 is made of load-bearing material, which is adapted to absorb the load of the window without undergoing deformation itself. Wood, plastic, or a rigid foam material can be used as the material of support part 2. It is highly advantageous, however, and also preferable, to use a metal such as steel or aluminum for certain elements (first leg 10 and second leg 16) of support part 2.

Support part 2 comprises a first leg 10, which comprises a first side surface 9 extending in the longitudinal direction and which faces wall 8 (FIG. 3). In first leg 10, one or preferably several through-holes (not shown) can be provided, which serve to allow the passage of one or more fastening elements 20. As already explained above, each fastening element 20 serves to screw support part 2, and thus, support section 1 to wall 8. Only the heads of the screws of the fastening elements 20 can be seen in the drawings.

It is also possible not to provide a through-hole in first leg 10 of support part 2 and instead to have the worker produce it in support part 2 on site.

A second leg 16 of support part 2 projects at a right angle from first leg 10 and extends, in the installed state, from leg 10 in the direction away from wall 8.

Support part 2 also comprises a third leg 17, which projects from first leg 10 a certain distance away from second leg 16 and is parallel to second leg 16. In the example shown here, third leg 17 has substantially the same thickness as second leg 16, but the expert can modify this as desired. Legs 16, 17 are configured here as narrow strips with a rectangular cross section and with a thickness of 0.5-20 mm, and preferably of 1-15 mm. Each of them, however, can also have some other cross-sectional shape such as a conical cross section.

The embodiment of the support section shown in FIGS. 2 and 3 contains specifically two L-shaped angle elements 37, 38, which are placed next to each other and are connected to each other and to wall 8 by the fastening element 20. Angle elements 37, 38 are preferably made of metal, even more preferably of steel or aluminum. First angle element 37 forms first leg 10 and second leg 16 of support part 2, whereas angle element 38 comprises third leg 17 and a fourth leg 19 of support part 2. Fourth leg 19 is arranged parallel to first leg 10 but is shorter. Fastening element 20, in the installed state, projects through both fourth leg 19 and first leg 10 of support part 2.

In the angle area between first leg 10 and second leg 16, at least one stiffening rib 33 can be arranged. The shape and configuration of stiffening rib 33 can be varied by the expert. Other stiffening measures can also be helpful (for example, curving the material).

To obtain a greater distance from wall 8, a support block 5 is arranged in the area of first side surface 9 of first leg 10. In the installed state (FIG. 3), support block 5 is arranged between first leg 10 of support part 2 and wall 8. Support block 5 is part of support part 2, and fastening elements 20

(not shown) pass completely through it. Support block 5 is made of load-bearing material. It preferably consists of a load-bearing rigid foam material with a density of >100 kg/m$^3$, and preferably >200 kg/m$^3$. A rigid foam of this type is known under the names "Purenit" and "Compacfoam", for example. It is preferable for insulating part 4 also to surround the sides of support block 5, and it is especially preferable for it to extend all the way to wall 8.

As can be seen in FIG. 3, window frame 34, in the installed state, is screwed to second leg 16 and to third leg 17 of support part 2. In the present case, second leg 16 serves primarily to absorb the load by way of at least one fastening element 20 under interposition of support block 5, whereas third leg 17, because it provides a second point of fixation, serves the important purpose of preventing screw element 35 from tilting.

Side surface 6 of support section 1, which serves to support window frame 34, always lies in the area of second leg 16, but it is always configured as a side surface of insulating part 4. In other words, window frame 34 never lies directly on second leg 16 of support part 2, but at least a section of insulating part 4 always lies in between. Under certain conditions, additional insulating or damping material can be introduced between insulating part 4 and window frame 34. The load is always absorbed primarily via second leg 16 of support part 2. For this purpose, a screw attaching window frame 34 to support part 2 passes through insulating part 4 (FIG. 3).

Insulating part 4 is made of rigid foam or of compacted mineral wool. Such materials are usually self-supporting, but they cannot absorb big loads. Examples of such materials include polystyrene, polyurethane, wood foams, etc., with densities of <100 kg/m$^3$, and preferably of <50 kg/m$^3$, which are considered thermal insulation materials and cannot bear the same large static loads which similar rigid foams with densities of >100 kg/m$^3$ or even >200 kg/m$^3$ are capable of doing. Insulating part 4 is preferably air-tight.

Insulating part 4 is connected to support part 2 and is arranged at least on the side of first leg 10 of support part 2 opposite first side surface 9. In the embodiment shown here, insulating part 4 is made as a one-piece unit. Insulating part 4 comprises two slots 30, into which second leg 16 and third leg 17 of support part 2 are inserted. Thus, insulating part 4 surrounds three sides of both second leg 16 and third leg 17 of support part 2.

In the installation situation shown in FIG. 3, insulating part 4 can also be bonded to wall 8 with an adhesive. Insulating part 4 can also be adhesively bonded to support part 2 in the area of first leg 10 and/or of second leg 16 and/or of third leg 17 and/or of fourth leg 19. The bonding can be achieved over the entire surface area or only part of it. This also applies to the adhesive bond between insulating part 4 and wall 8.

Hooks 25 can be formed on second leg 16 and/or on third leg 17 of support part 2 to ensure that insulating part 4 is held firmly in place on support part 2.

Various modification of support section 1 are possible within the scope of the invention. As the simplest modification, legs 10, 16, and 17 can be configured as a single, one-piece unit. Also the fourth leg 19 can be omitted.

The diagram in FIG. 2, furthermore, also shows schematically an insulating section 3, which comprises a filler element 39 and an insulating part 15. In the diagram (also in FIG. 4), insulating section 3 and support section 1 are shown a certain distance apart for the sake of clarity. Preferably, these elements are positioned as closely together as possible. Insulating parts 4, 15 are also shown only partially, so that the interior parts can be seen. Preferably, insulating parts 4, 15 cover support part 2 and filler element 39 completely.

In the embodiment according to FIG. 2, filler element 39 is configured in such a way that its shape approximates that of support part 2, so that an identically shaped insulating part 4, 15 can be set on top of support part 2 and also on top of filler element 39. In the present example, filler element 39 corresponds to the shape of support part 2 except for the projecting legs. Filler element 39 therefore fills the cavity 21 formed in insulating part 15 almost completely.

Filler element 39 is preferably made of the same material as that of insulating part 4. Filler element 39 is preferably bonded to wall 8 with an adhesive and can also be adhered to support part 2.

Insulating part 15 is preferably made of the same material as that of insulating part 4. Insulating parts 15 are preferably adhesively bonded to wall 8 and can also be adhered to insulating parts 4. Insulating part 15 is also preferably bonded adhesively to filler elements 39 in the area where their surfaces are in contact.

It is especially preferable for an insulating part 4 and an insulating part 15 to be configured as a one-piece unit at least in certain sections of window case 7. In all cases it is desirable for insulating parts 4, 15 to have the same cross-sectional form.

The embodiment of the parts of window case 7 shown in FIGS. 4 and 5 differ from the embodiment shown in FIGS. 2 and 3 in that only one angle, with a first leg 10 and a second leg 16, is provided in support part 2. No support block 5, furthermore, is present either, but a filler block 11 is provided in the interior space of the angle. Filler block 11 consists of the same material as that previously described for support block 5. It serves primarily to prevent screw elements 35 from twisting.

Fastening elements 20 in this case are screwed not only through first leg 10 but also through filler bock 11. Filler bock 11 can comprise a recess, into which the head of the screw is sunk.

In this exemplary embodiment, slot 30 in insulating part 4 must be made appropriately larger, because not only the second leg 16 but also filler block 11 must be accommodated in slot 30.

Correspondingly, filler element 39 is adapted to the new shape of support part 2.

A preferred method for arranging a window frame 34 on a wall 8 of a building section 28 will now be described with reference to FIGS. 2-5. First, support parts 2, specifically here at least first legs 10, are screwed to wall 8 by fastening elements 20. An adhesive bond can also be provided between support part 2 and wall 8.

Then, filler elements 39 are cut to size and adhesively bonded to wall 8 in the areas between support sections 1, so that a frame extending completely around the periphery is formed.

Insulating parts 4, 15 or the one-piece insulating part 4, 15 are set onto support parts 2 and filler elements 39 in such a way that second leg 16 and third leg 17 of support part 2 slides into the associated slots 30 of insulating part 4 and filler element 39 and fill up substantially all of the cavities 21 in insulating part 15.

Insulating part 4, 15 is usually pushed down until it contacts wall 8 or first leg 10 of support part 2 or filler element 39. Under certain conditions, additional adhesive bonds can be produced between insulating part 4, 15 and wall 8, and an adhesive bond between insulating part 4, 15 and support part 2 or filler element 39 can also ensure that window case 7 now obtained is held solidly together.

Window frame 34 is then screwed, under interposition of at least one section of insulating parts 4, to at least second legs 16 of support parts 2 of support sections 1.

All of the details described above for the various exemplary embodiments can be exchanged and modified.

Support blocks 5 can be used in any desired embodiment. In particular, they can be used in the embodiments according to FIGS. 4 and 5. Filler block 11 can also be used in all of the embodiments, especially also in the embodiments shown in FIGS. 2 and 3.

Finally, the number and spatial arrangement of fastening elements 20 and screw elements 35 can be freely selected by the expert depending on the concrete application.

In all of the embodiments it is also conceivable that insulating part 4 only partially, not completely, surrounds one or more sides of second leg 16 and/or third leg 17 of support part 2.

In the installed state, furthermore, additional insulating materials can be used for insulating purposes.

In regard to the formation of all of the adhesive bonds cited above, the adhesive is preferably applied as a bead of adhesive and preferably to at least one of the two parts to be joined before the parts are assembled.

Filler element 39 and insulating part 15 can be configured together as a one-piece unit. Alternatively, insulating part 4 and insulating part 15 can be configured together as a one-piece unit. Filler element 39, insulating part 15, and insulating part 4 can also be configured all together as a one-piece unit. In this case, an irregular shape of this one-piece element in the longitudinal direction of window case 7 is obtained.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. A building section comprising:
a wall; and
a peripheral window case, into which a window frame is inserted, the peripheral window case is offset outwardly from a plane of the wall; the window case including several support sections arranged a certain distance apart and standing laterally out from the wall, each support section having a support part and an insulating part, the support part comprising a first leg with a first side surface facing the wall and a second leg, which projects from the first leg on a side opposite the first side surface, the support part is made of load-bearing material, the insulating part consists of compacted mineral wool or a rigid foam, the insulating part surrounding three sides of the second leg of the support part, and the first leg of the support part is screwed to the wall by at least one fastening element; the window case also comprising insulating sections consisting of compacted mineral wool or a rigid foam in areas between support sections; the window frame is screwed to the second legs of the support parts of the support sections by screw elements under interposition of at least one section of the insulating parts; and the insulating parts of the support sections and the insulating sections are arranged and configured in such a way that they bring about a substantially continuous insulation of the window frame around the window case.

2. The building section of claim 1 wherein the insulating sections are configured in two parts with a filler element as a base and an insulating part set on top of the filler element.

3. The building section of claim 2 wherein the insulating parts of the insulating sections and the insulating parts of the support sections comprise the same cross section.

4. The building section of claim 2 wherein the insulating part of at least one insulating section and the insulating part of at least one support section are configured together as a one-piece unit.

5. The building section of claim 2 wherein the filler elements correspond substantially to a basic shape of the support parts of the support sections.

6. The building section of claim 2 wherein the filler elements substantially completely fill cavities in an interior of the insulating parts of the insulating sections.

7. The building section of claim 1 wherein the insulating sections are bonded adhesively to the wall.

8. The building section of claim 1 wherein the insulating sections are bonded adhesively to the support sections.

9. The building section of claim 1 wherein the support parts of the support sections also comprise a support block, which is arranged between the first leg and the wall.

10. The building section of claim 9 wherein the support block is made of load-bearing rigid foam.

11. The building section of claim 9 wherein the support block is rectangular in cross section.

12. The building section of claim 1 wherein at least the first leg and the second leg of each support part are made of metal.

13. The building section of claim 1 wherein the insulating part of each support section comprises at least one slot, into which the second leg of the support part is inserted.

14. The building section of claim 1 wherein the second leg of each support part projects from the first leg of the support part at a right angle.

15. The building section of claim 1 wherein each support part comprises a third leg, which projects from the first leg a certain distance away from the second leg and parallel to the second leg, wherein the insulating part of the support section surrounds three sides of both the second leg and the third leg of the support part and the screw elements for fastening the window frame are also screwed through the third leg of the support parts.

* * * * *